United States Patent
Pawl et al.

(10) Patent No.: US 7,508,198 B2
(45) Date of Patent: Mar. 24, 2009

(54) LOAD GENERATING ENCODER WHEEL

(75) Inventors: Rory S. Pawl, Waterford, MI (US); Chad D. Bauer, Fenton, MI (US)

(73) Assignee: Freudenberg-NOK General Partnership, Plymouth, MI (US)

(*) Notice: Subject to any disclaimer, the term of this patent is extended or adjusted under 35 U.S.C. 154(b) by 0 days.

(21) Appl. No.: 11/830,168

(22) Filed: Jul. 30, 2007

(65) Prior Publication Data
US 2009/0033168 A1    Feb. 5, 2009

(51) Int. Cl.
*G01B 7/30* (2006.01)
(52) U.S. Cl. ............... 324/207.25; 324/174; 73/514.39
(58) Field of Classification Search ......... 324/173–174, 324/207.25; 73/514.31, 514.39; 267/36.1, 267/41, 70–71, 73–74; 384/448
See application file for complete search history.

(56) References Cited

U.S. PATENT DOCUMENTS 5,081,416 A * 1/1992 La Croix .................. 324/173
5,382,098 A * 1/1995 Rigaux et al. ............... 384/448
5,975,767 A * 11/1999 Mizukoshi et al. .......... 384/544
2005/0194969 A1 * 9/2005 Koike et al. ............ 324/207.25

* cited by examiner

*Primary Examiner*—Bot LeDynh
(74) *Attorney, Agent, or Firm*—Ronald W. Wangerow; Harness, Dickey & Pierce, P.L.C.

(57) ABSTRACT

A shaft assembly, includes an elongated shaft and a flywheel mounted to an end of the shaft. An encoder is mounted to the shaft and includes an annular support ring having a radially inwardly extending portion and an axially extending portion extending from a radially outer end of the radially inwardly extending portion. The radially inwardly extending portion defines a spring section which is compressed between the flywheel and the end of the shaft, and an encoder material is disposed on the axially extending portion of the annular support ring.

9 Claims, 2 Drawing Sheets

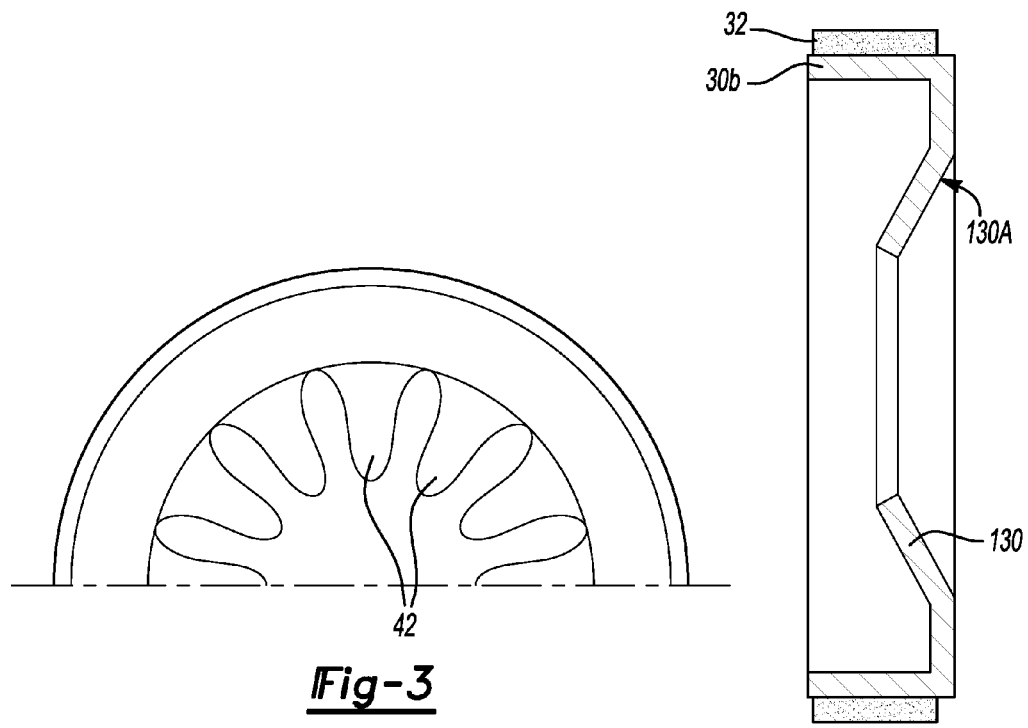
Fig-3
Fig-4
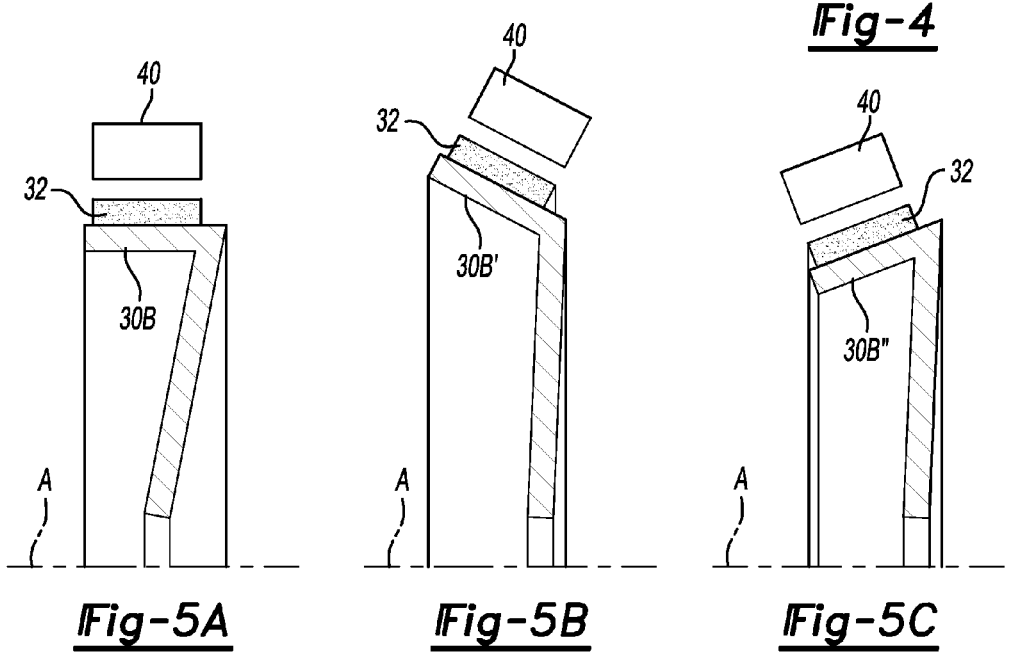
Fig-5A
Fig-5B
Fig-5C

US 7,508,198 B2

LOAD GENERATING ENCODER WHEEL

FIELD

The present disclosure relates to speed sensors and more particularly to a load generating speed sensor encoder wheel and a method of making same.

BACKGROUND

The statements in this section merely provide background information related to the present disclosure and may not constitute prior art.

Engine speed sensors have typically been incorporated on the camshaft or crankshaft of the engine for providing accurate engine and transmission control. Encoder wheels are used in speed sensor devices to determine the rotational speed or position of a component. The encoder wheel typically includes an outer surface having magnetized ferrite therein. The ferrite can be magnetized to form alternating north and south poles around the circumference of the encoder wheel. In recent rotational speed sensing systems, active encoder wheels have been mounted to the end of the crankshaft, and an active or passive sensor is mounted in close proximity to the encoder wheel. The engine speed sensor of this type provides precise speed and position measurement for accurate misfire detection.

As the encoder wheel rotates, a magnetic sensor measures the change in the magnetic field of the alternating poles. From this alternating magnetic field, the rotational speed of the encoder wheel may then be calculated, and in turn the rotational speed of the component to which the encoder wheel is coupled is known.

SUMMARY

The present disclosure provides a shaft assembly, including an elongated shaft and a flywheel mounted to an end of the shaft. A load generating encoder is mounted to the shaft and includes an annular support ring having a radially inwardly extending portion and an axially extending portion extending at a non-right angle relative to a radially outer end of the radially inwardly extending portion. The radially inwardly extending portion is compressed between the flywheel and the end of the shaft in spring-like fashion, and an encoder material is disposed on the axially extending portion of the annular support ring.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 3 is a plan view illustrating a load generating encoder wheel according to the principles of the present disclosure;

FIG. 4 is a cross-sectional view of a load generating encoder wheel according to the principles of the present disclosure; and FIGS. 5A-5C illustrate different orientations of the axially extending portion of the encoder wheel.

DETAILED DESCRIPTION

The following description is merely exemplary in nature and is not intended to limit the present disclosure, application, or uses.

Figure 1:
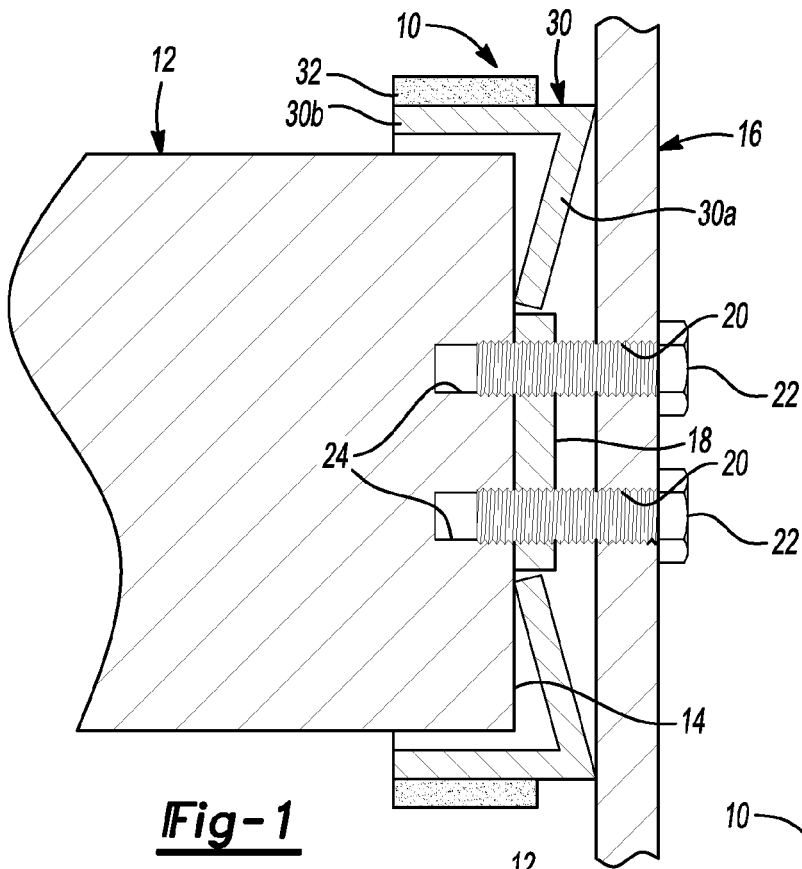
FIG. 1 is a cross-sectional view of a load generating encoder wheel illustrated during assembly to a crankshaft according to the principles of the present disclosure.
Figure 2:
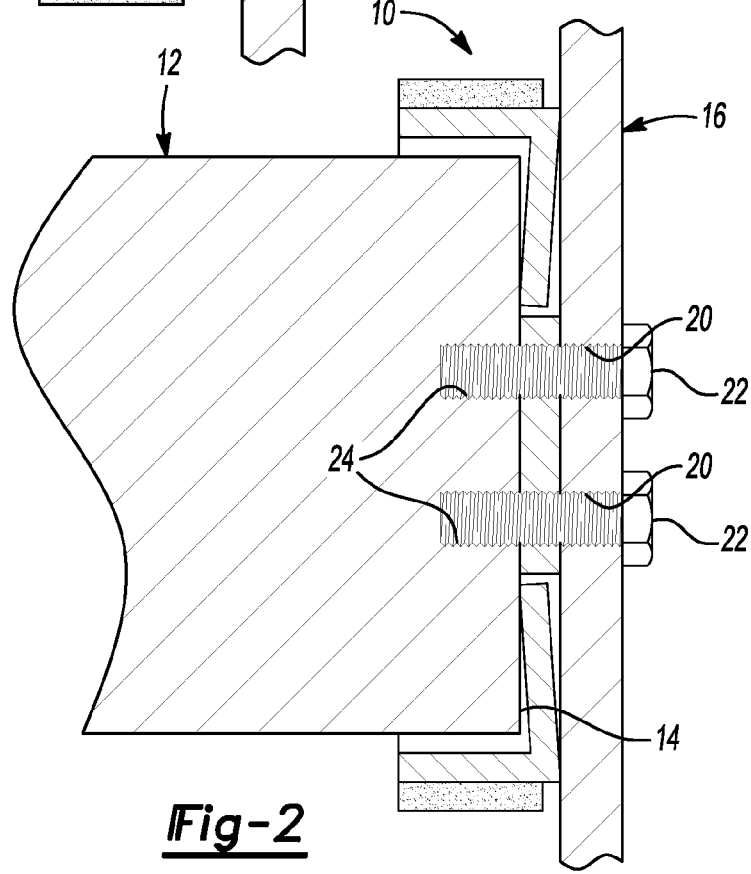
FIG. 2 is a cross-sectional view of a load generating encoder wheel mounted to a crankshaft according to the principles of the present disclosure.

With reference to FIGS. 1 and 2, the load generating encoder wheel 10, according to the principles of the present disclosure, will now be described. The load generating encoder wheel 10 is mounted to a crankshaft 12 and is compressed in spring-like fashion between an end 14 of the crankshaft 12 and a flywheel/flex plate member 16. The end of the crankshaft 12 includes a raised pilot portion 18. The flywheel 16 can be provided with a plurality of mounting apertures 20 extending therethrough that receive a corresponding number of threaded fasteners 22 that are threadedly engaged with corresponding threaded apertures 24 provided in the end 14 of crankshaft 12.

The load generating encoder wheel 10 includes an annular support ring 30 that can be formed as a stamping having a radially inwardly extending portion 30A and an axially extending portion 30B that extends from a radially outer end of the radially inwardly extending portion 30A. The radially inward extending portion 30A, as shown in FIG. 1, defines a spring section that can have a generally conical shape in its unassembled condition. As an alternative, as shown in FIG. 4, a portion 130 of radially inward extending portion 130A can define a spring section that can be generally conical in shape. The orientation of the radially inwardly extending portion 30A, 130A relative to the axially extending portion 30B can form an acute angle, although an obtuse angle may also be utilized. An encoder material 32 is disposed on the axially extending portion 30B of the annular supporting ring 30. The axially extending portion 30B can be designed such that when assembled, the encoder surface 32 can be in any angular position relative to axis A so as to generate a flux perpendicular to the sensor 40. In particular, FIGS. 5A-5C illustrate alternative arrangements of the axially extending portion 30B (parallel), 30B' (obtuse angle), 30B" (acute angle). The encoder material can include a ferrite loaded rubber or other known encoder materials. The annular support ring 30 can be made from carbon steel or other metals or engineering plastic materials. The non-right angle formed between the radially inward extending portion 30A and the axially extending portion 30B can form an acute angle, as discussed above, and can be between 0.1 degrees and 25 degrees. Alternatively, the non-right angle can be an obtuse angle that can be between 90.1 degrees and 115 degrees.

The radially inward extending portion 30A has an inner diameter that is approximately equal to the outer diameter of the raised pilot portion 18 of crankshaft 12. Thus, the pilot portion 18 can provide a centering function with regard to locating the encoder wheel 10 relative to the shaft 12 and flywheel 16. The pilot portion 18 can alternatively be located on the flywheel 16 and used in combination with the encoder wheel having an obtuse angle between the radially inward extending portion 30A and axially extending portion 30B of the annular support ring 30. As an alternative to the pilot portion 18, other alignment features can be used. The raised pilot portion 18 can have a circular outer perimeter, or can be provided with shape irregularities such as flats or keys or other alignment features that engage an inner diameter of the radially inwardly extending portion 30A to ensure that the encoder wheel 10 does not rotate relative to the crankshaft 12. The raised pilot portion 18 can have an axial dimension that is greater than a thickness of the radially inwardly extending portion 30A of the annular support ring 30 so that the mounting of the flywheel 16 to the crankshaft 12 causes spring-like compression of the radially inwardly extending portion 30A of the annular support ring 30 but does not clamp against the radially inwardly extending portion 30A. Thus, as illustrated in FIG. 2, the radially inwardly extending portion 30A, which has a conical shape, is spring-loaded to provide a retaining function, but is not clamped tightly between the end 14 of the crankshaft 12 and the flywheel 16. It should be noted that the spring section of the inwardly extending portion 30A can include spaced spring like fingers 42, as illustrated in FIG. 3, or raised tabs or dimples, or otherwise can include other shapes that produce load when compressed under the assembled condition.

For purposes of this disclosure, it should be understood that although the invention is described with respect to a crankshaft and flywheel assembly, the crankshaft can be other known shaft designs such as a cam shaft or other shaft which requires accurate speed or position sensing, and the flywheel 16 can include other flywheel-type structures such as flex plates which are intended to fall within the definition of flywheel as utilized in the present specification and claims.

The stamping of the encoder support ring is shaped to act as a spring washer in order to place a positive force from the flywheel or flex plate through the encoder to the crankshaft. The design allows the encoder to have line-to-line contact with the flywheel/flex plate and crankshaft while it pushes back on both members to hold it in place. This design allows the encoder to be used in areas where space is limited, a sandwiching method between the crank and the flywheel/flex plate cannot be used, and where a press-on design is not desirable.

What is claimed is:

1. A shaft assembly, comprising:
an elongated shaft;
a flywheel mounted to an end of said shaft; and
an encoder, including an annular support ring having a radially inwardly extending portion and an axially extending portion extending from a radially outer end of said radially inwardly extending portion, said radially inwardly extending portion defining a spring section which is compressed between said flywheel and said end of said shaft, and an encoder material disposed on said axially extending portion of said annular support ring.

2. The shaft assembly according to claim 1, wherein said encoder material includes a ferrite loaded rubber.

3. The shaft assembly according to claim 1, wherein said spring section of said radially inwardly extending portion has a conical shape.

4. The shaft assembly according to claim 1, wherein said spring section of said radially inwardly extending portion includes a plurality of spaced fingers.

5. The shaft assembly according to claim 1, wherein said annular support ring is made from carbon steel.

6. The shaft assembly according to claim 1, wherein said spring section is offset from perpendicular to an axis of rotation by an acute angle between .1 degrees and 25 degrees.

7. The shaft assembly according to claim 1, wherein said elongated shaft includes a raised pilot portion disposed on said end of said shaft, said raised pilot portion having a diameter approximately equal to an inner diameter of said radially extending portion of said annular support ring.

8. The shaft assembly according to claim 7, wherein said raised pilot portion has a thickness greater than a thickness of said radially inwardly extending portion of said annular support ring.

9. The shaft assembly according to claim 1, wherein said flywheel is mounted to said shaft by a plurality of bolts.

\* \* \* \* \*